(12) United States Patent
Goral et al.

(10) Patent No.: US 8,396,723 B1
(45) Date of Patent: **\*Mar. 12, 2013**

(54) REFLEXIVE UNDERWRITING APPLICATION RESPONSES

(75) Inventors: James E. Goral, San Antonio, TX (US); Richard Charles Neal, San Antonio, TX (US); Michael Belko, Boerne, TX (US)

(73) Assignee: USAA, San Antonio, TX (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/317,564

(22) Filed: Dec. 23, 2005

(51) Int. Cl.
*G06Q 40/00* (2012.01)
(52) U.S. Cl. .......................................................... 705/4
(58) Field of Classification Search ....................... 705/4
See application file for complete search history.

(56) References Cited

U.S. PATENT DOCUMENTS

| 5,752,236 | A | 5/1998 | Sexton | |
|---|---|---|---|---|
| 5,802,493 | A | 9/1998 | Sheflott et al. | |
| 6,112,049 | A | 8/2000 | Sonnenfeld | |
| 6,289,513 | B1 | 9/2001 | Bentwich | |
| 6,721,756 | B2 | 4/2004 | Yagihashi et al. | |
| 2002/0120474 | A1 | 8/2002 | Hele et al. | |
| 2003/0187768 | A1* | 10/2003 | Ryan et al. | 705/35 |
| 2003/0233260 | A1* | 12/2003 | Snell et al. | 705/4 |

OTHER PUBLICATIONS

Non-Final Office Action for U.S. Appl. No. 11/317,565 mailed on May 13, 2011, 11 pages.

\* cited by examiner

*Primary Examiner* — Harish T Dass
*Assistant Examiner* — Seth Weis
(74) *Attorney, Agent, or Firm* — Kilpatrick Townsend & Stockton LLP (57) ABSTRACT

Systems and methods for gathering information for insurance underwriting may present a question from a sequence of questions. Questions in the sequence of questions may relate to an insurance underwriting function. A response to the question may be collected and analyzed. An investigative function may be selected based upon the analysis of the response to the question. Other embodiments may be described and claimed.

15 Claims, 8 Drawing Sheets

REFLEXIVE UNDERWRITING APPLICATION RESPONSES

CROSS REFERENCES

This application is related to U.S. application Ser. No. 11/318,026 titled "Reflexive Underwriting Application Responses" filed on Dec. 23, 2005. This application is also related to U.S. application Ser. No. 11/317,565 titled "Reflexive Underwriting Application Responses" filed on Dec. 23, 2005.

TECHNICAL FIELD

Various embodiments described herein relate to insurance underwriting generally.

BACKGROUND INFORMATION

Underwriting an application for insurance may involve a significant amount of information gathering, including information regarding complex medical conditions and health issues. Some or all of the information may be gathered by interviewers, including interviewers associated with third-party vendors to an underwriting insurance company. The interviewers may have little medical education or knowledge. Consequently, an interviewer may obtain inadequate medical information and may fail to ask important questions to follow up on significant medical conditions. The interviewer may not understand or record an applicant's responses to some questions. For example, an interviewer may have trouble properly recording medication and disease information, resulting in misspelled or incorrect information.

When the underwriting insurance company receives an application with inadequate documentation, including perhaps inadequate medical documentation, additional information may be required to move an underwriting process forward. An underwriter may be required to request additional information-gathering activities from the interviewing vendor and/or request medical records directly from the applicant's health care providers. This additional research may delay processing of an insurance application by days, weeks, or even months. The applicant for insurance may become impatient and fail to complete the remainder of the insurance application process; and this may result in lost sales.

DETAILED DESCRIPTION

Some embodiments of the invention may execute structured sequences of activities useful for assisting a non-medical interviewer to complete an interview of an applicant for insurance. Systems employing such sequences may direct the interviewer's line of questioning to identify and document significant medical conditions. Disclosed embodiments may also direct the interviewer to cause additional diagnostic activities to be performed when appropriate. Disclosed structures and methods may also assist the interviewer with correctly entering technical information, including perhaps information related to disease conditions and medications. Although some embodiments may be described in a context of medical or life insurance, disclosed embodiments may be applicable to other types of insurance.

Figure 1:
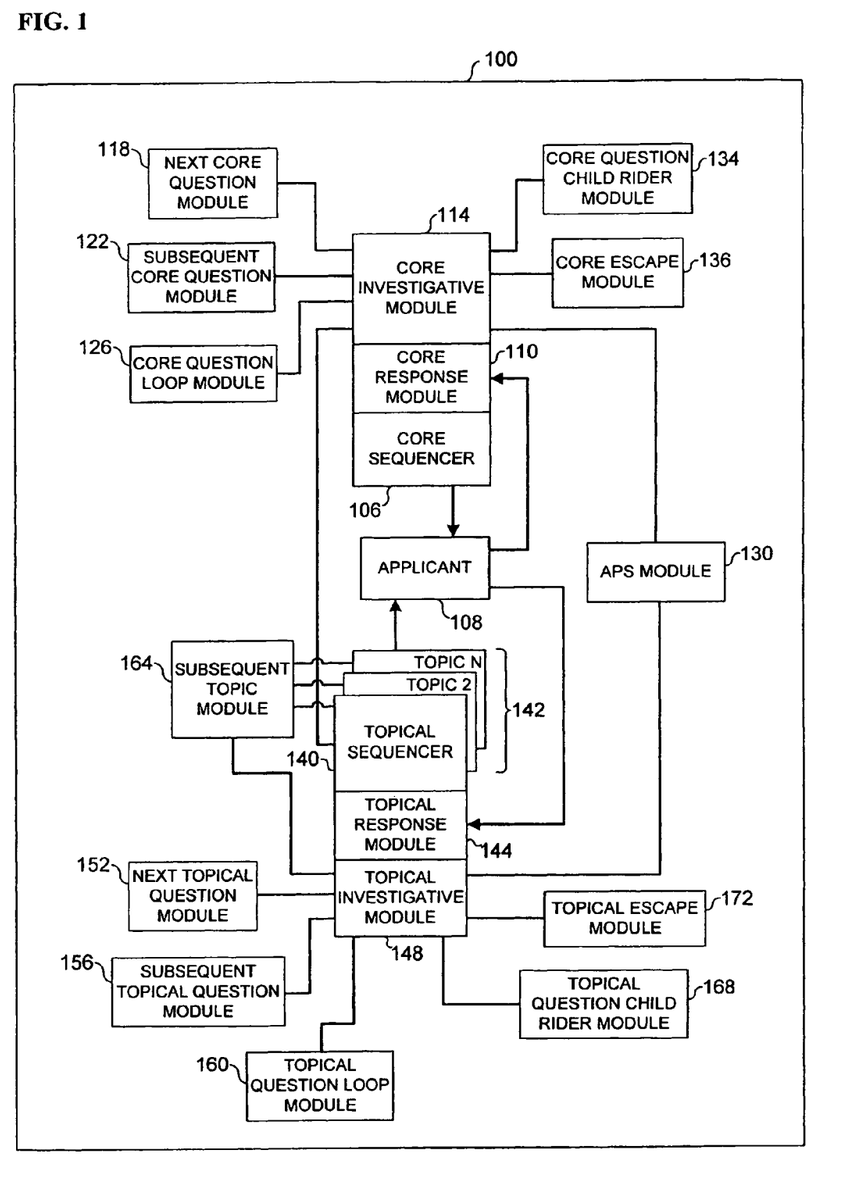
FIGS. 1-3 are block diagrams of systems according to various embodiments of the invention.

FIG. 1 comprises a block diagram of a system 100 according to various embodiments of the invention. A core sequencer 106 may present a core question from a core sequence of questions. The core question may be presented directly to an applicant for insurance 108. In some embodiments, the core question may be presented to an application interviewer, who may in turn present the core question to the applicant 108. Questions in the core sequence of questions may relate to an insurance underwriting function, including perhaps a life insurance underwriting function.

The system 100 may also include a core response module 110 in communication with the core sequencer 106. The core response module 110 may collect a response to the core question and may analyze the response. A core investigative module 114 may be in communication with the core sequencer 106, perhaps via the core response module 110. The core investigative module 114 may select a core investigative function to be performed based upon the analysis of the response to the core question.

The core sequence of questions may be sub-divided into various categories. Such categories may include a tobacco use category, an aviation category, an avocation category, a foreign travel category, a driving history category, a height and weight category, a central nervous system category, a respiratory system category, a circulatory system category, a gastrointestinal system category, a urinary system category, an endocrine system category, a muscle, bone, and skin category, a cancers category, a reproductive system category, and/or a blood and lymph system category, among others. Other subsets of questions may include a subset related to recent physical exams, a subset related to medical consultations, a subset related to prescription medications, a subset related to human immunodeficiency virus and acquired immune deficiency syndrome, a subset related to medical diagnostic testing, a subset related to prior applications for insurance, a subset related to substance abuse, a subset related to genetic propensities, and/or a subset related to cancer, among others.

The system 100 may further include a next core question module 118 in communication with the core investigative module 114 to present a next core question selected from the core sequence of questions. A subsequent core question module 122 may also be in communication with the core investigative module 114. The subsequent core question module 122 may skip the next core question and instead present a subsequent core question selected from the core sequence of questions. A core question loop module 126 may be in communication with the core investigative module 114 to present one or more of the core question, the next core question, or the subsequent core question repeatedly until a condition is satisfied.

The system 100 may further include an attending physician's statement (APS) module 130 in communication with the core investigative module 114 to initiate the ordering of an APS. A core question child rider module 134 in communication with the core investigative module 114 may present one or more core questions associated with a child family member. A core escape module 136 may be in communication with the core investigative module 114 to terminate core sequencing operations.

In some embodiments, the system 100 may include a topical sequencer 140. The topical sequencer 140 may be in communication with the core investigative module 114 to present a topical question from one or more topical sequences of questions 142. The topical sequence(s) of questions 142 may relate to an insurance underwriting function. Examples may include sequences of questions related to urine test results, attention deficit hyperactive disorder, alcoholism, diseases of the blood and lymph glands, anxiety disorders, arthritis, asthma, bladder conditions, bone disorders, chest pain, depression, drug abuse, gastrointestinal disorders, hypertension, intestinal conditions, kidney conditions, liver conditions, heart murmurs, muscle conditions, endocrine system conditions, heart and circulatory system conditions, mental disorders, nervous system disorders, respiratory system disorders, pancreatic conditions, pneumonia, pregnancy, prostate conditions, rectal conditions, reproductive system conditions, seizure, sexually transmitted diseases, skin conditions, sleep apnea, stomach conditions, throat conditions, thyroid conditions, tumors, or ureteral conditions, among others. The topical sequence(s) of questions 142 may also include non-medically related topics.

A topical response module 144 may be in communication with the topical sequencer 140 to collect a response to the topical question and to analyze the response. A topical investigative module 148 may be in communication with the topical sequencer 140, perhaps via the topical response module 144. The topical investigative module 148 may select a topical investigative function to be performed based upon the analysis of the response to the topical question.

A next topical question module 152 may be in communication with the topical investigative module 148 to select a next topical question from the topical sequence(s) of questions 142. A subsequent topical question module 156 may also be in communication with the topical investigative module 148. The subsequent topical question module 156 may skip the next topical question and instead present a subsequent topical question selected from the topical sequence(s) of questions 142. A topical question loop module 160 may be in communication with the topical investigative module 148. The topical question loop module 160 may present the topical question, the next topical question, and/or the subsequent topical question repeatedly until a condition is satisfied.

The system 100 may also include a subsequent topic module 164 in communication with the topical investigative module 148. The subsequent topic module 164 may initiate questioning from a subsequent one of the topical sequence(s) of questions 142. A topical question child rider module 168 may be in communication with the topical investigative module 148. The topical question child rider module 168 may present one or more topical questions about a child family member. A topical escape module 172 in communication with the topical investigative module 148 may terminate topical sequencing operations. It is noted that the APS module 130 may be in communication with the topical investigative module 148 to initiate the ordering of an APS. Other embodiments may be possible.

Figure 2:
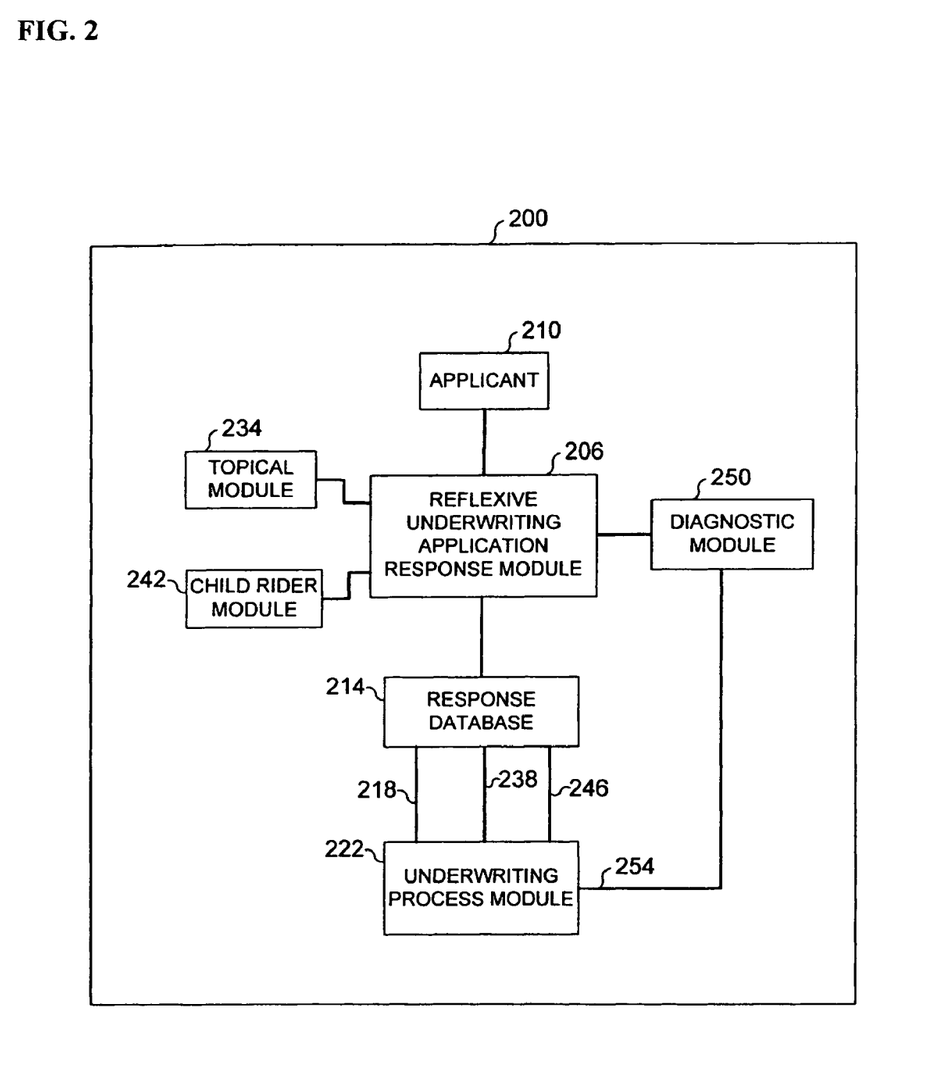

FIG. 2 comprises a block diagram of a system 200 according to various embodiments of the invention. The system 200 may include a reflexive underwriting application response module 206. The reflexive underwriting application response module 206 may present a set of questions to an applicant for insurance 210. The set of questions may comprise categories and subsets of questions as previously described. A response received from the applicant 210 to one or more previous questions may determine which question is chosen from the set of questions for subsequent presentation to the applicant 210.

A response database 214 in communication with the reflexive underwriting application response module 206 may store a set of responses to the set of questions. The response database 214 may provide a response input 218 to an insurance underwriting process module 222. The system 200 may also include a topical module 234 in communication with the reflexive underwriting application response module 206. The topical module 234 may present a topical subset of questions to the applicant 210 upon sensing a topically-related response to one or more questions associated with the set of questions. The topical subset of questions may comprise questions related to one or more medical conditions, and may be invoked if a response to a previous questions suggests that a particular topic should be covered in more detail. The topical module 234 may also cause a set of responses to the topical subset of questions to be stored in the response database 214. The set of responses to the topical subset of questions may be used as a topical input 238 to the insurance underwriting process module 222.

The system 200 may further include a child rider module 242 in communication with the reflexive underwriting application response module 206. The child rider module 242 may present a set of questions pertaining to a child family member associated with the applicant if a child rider option is selected. The child rider module 242 may also cause a set of responses to the questions pertaining to the child family member to be stored for use as a child rider input 246 to the insurance underwriting process module 222.

A diagnostic module 250 may be in communication with the reflexive underwriting application response module 206. The diagnostic module 250 may perform a diagnostic activity upon sensing a diagnostically-related response to one or more questions associated with the set of questions. The diagnostic activity may comprise an attending physician statement, a urinalysis, a blood diagnostic test, a medical imaging diagnostic test, or/or a cardiac stress test. The diagnostic module 250 may also supply a set of results from the diagnostic activity as a diagnostic input 254 to the insurance underwriting process module 222.

Figure 3:
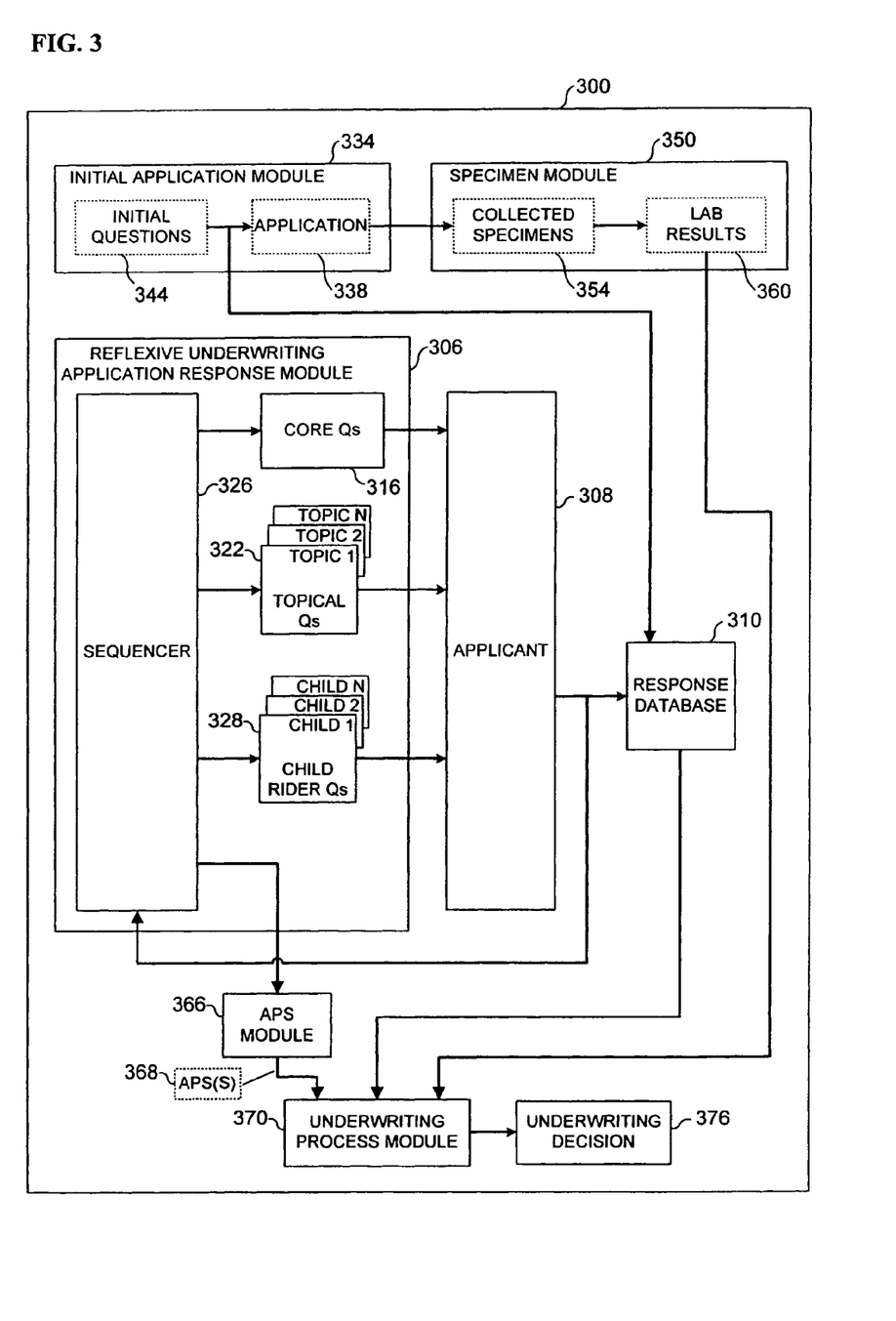

FIG. 3 comprises a block diagram of a system 300 according to various embodiments of the invention. A reflexive underwriting application response module 306 may adaptively formulate a set of questions to present to an applicant for insurance 308. The set of questions may be associated with an insurance underwriting function. The reflexive underwriting application response module 306 may also collect a response to each question and store the response to each question in a response database 310. The reflexive underwriting application response module 306 may further perform an analysis of the response to each question. One or more questions associated with the set of questions may be selected for presentation as a result of the analysis of a response to one or more previous questions associated with the set of questions. In some embodiments, the set of questions may comprise a core set of questions 316 and one or more topical subsets of questions 322.

The system 300 may also include a sequencer component 326 of the reflexive underwriting application response module 306. The sequencer component 326 may select a next question from the core set of questions 316, from the topical subset(s) of questions 322, or from one or more child rider subsets of questions 328. The child rider subset(s) of questions 328 may pertain to a child family member if an application is being made for a child rider.

The system 300 may further include an initial application module 334 to present an initial set of questions 344 to the applicant 308. The initial application module 334 may also store responses to the initial set of questions 344 in the response database 310, and may generate an application for insurance 338. A specimen module 350 may be in communication with the initial application module 334 to collect medical laboratory specimens 354 from the applicant 308. The specimen module 350 may also analyze the medical laboratory specimens 354 to produce a set of laboratory results 360.

In some embodiments, an APS module 366 may be in communication with the reflexive underwriting application response module 306 to order one or more APSs 368. An underwriting process module 370 may be in communication with one or more of the response database 310, the APS module 366, and the specimen module 350. The underwriting process module 370 may receive and analyze contents of the response database 310, the APS(s) 368, and the set of laboratory results 360. The underwriting process module 370 may produce an underwriting decision 376 as a result.

Any of the components previously described can be implemented in a number of ways, including embodiments in software. Thus, the system 100; core sequencer 106; applicant for insurance 108, 210, 308; core response module 110; core investigative module 114; next core question module 118; subsequent core question module 122; core question loop module 126; attending physician's statement (APS) module 130, 366; core question child rider module 134; core escape module 136; topical sequencer 140; topical sequences of questions 142; topical response module 144; topical investigative module 148; next topical question module 152; subsequent topical question module 156; topical question loop module 160; subsequent topic module 164; topical question child rider module 168; topical escape module 172; system 200; reflexive underwriting application response module 206; response database 214, 310; core response input 218; insurance underwriting process module 222, 370; topical module 234; topical input 238; child rider module 242; child rider input 246; diagnostic module 250; diagnostic input 254; system 300; reflexive underwriting application response module 306; core set of questions 316; topical subset(s) of questions 322; sequencer component 326; child rider subset (s) of questions 328; initial application module 334; application for insurance 338; initial set of questions 344; specimen module 350; medical laboratory specimens 354; set of laboratory results 360; APS(s) 368; and underwriting decision 376 may all be characterized as "modules" herein.

The modules may include hardware circuitry, single or multi-processor circuits, memory circuits, software program modules and objects, firmware, and combinations thereof, as desired by the architect of the systems 100, 200, and 300, and as appropriate for particular implementations of various embodiments.

Apparatus and systems of various embodiments can be used in applications other than gathering information for insurance underwriting. Thus, various embodiments of the invention are not to be so limited. The illustrations of the systems 100, 200, and 300 are intended to provide a general understanding of the structure of various embodiments. They are not intended to serve as a complete description of all the elements and features of apparatus and systems that might make use of the structures described herein. Some embodiments may include a number of methods.

Figure 4A:
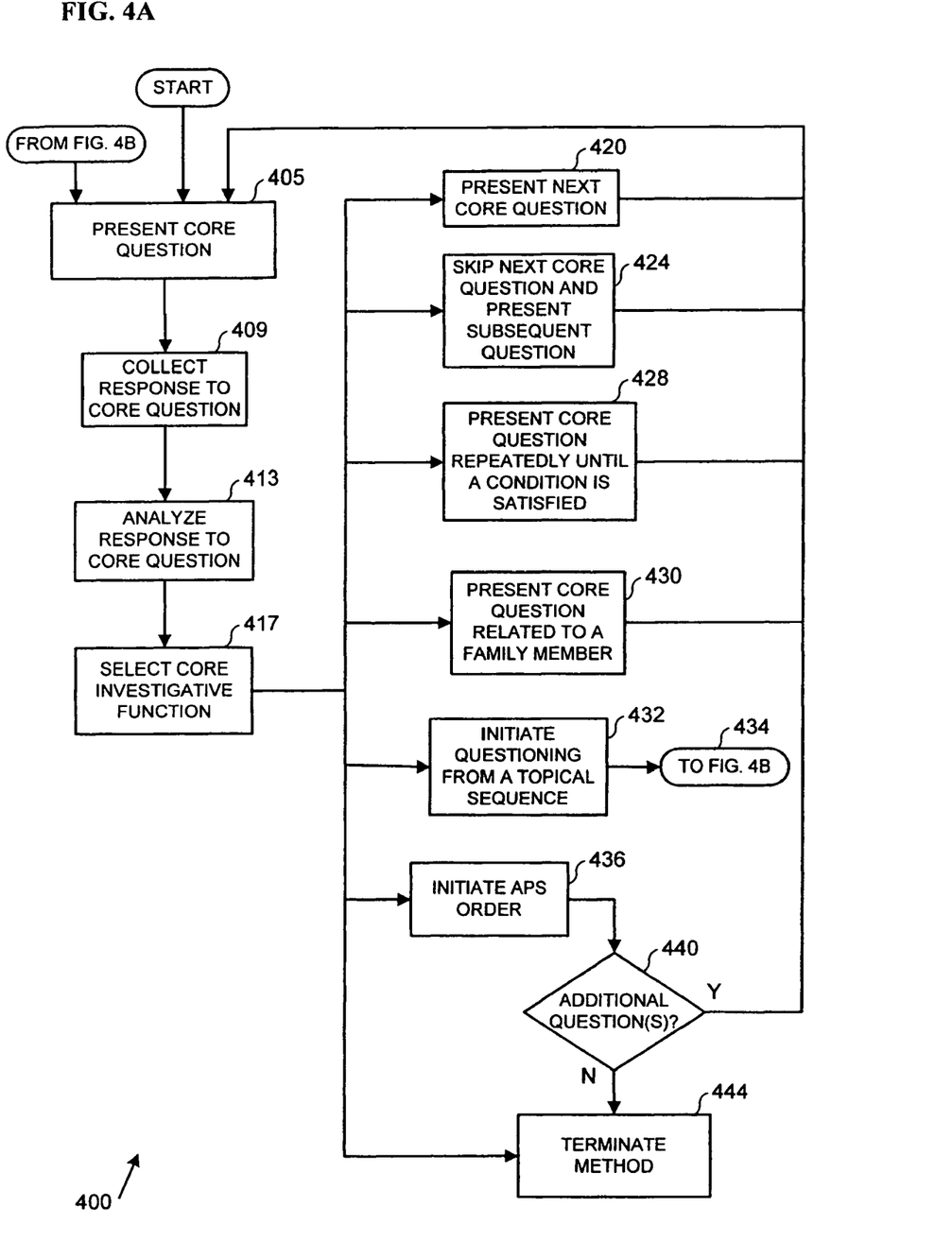
FIGS. 4A, 4B, 5, and 6 are flow diagrams illustrating several methods according to various embodiments of the invention.
Figure 4B:
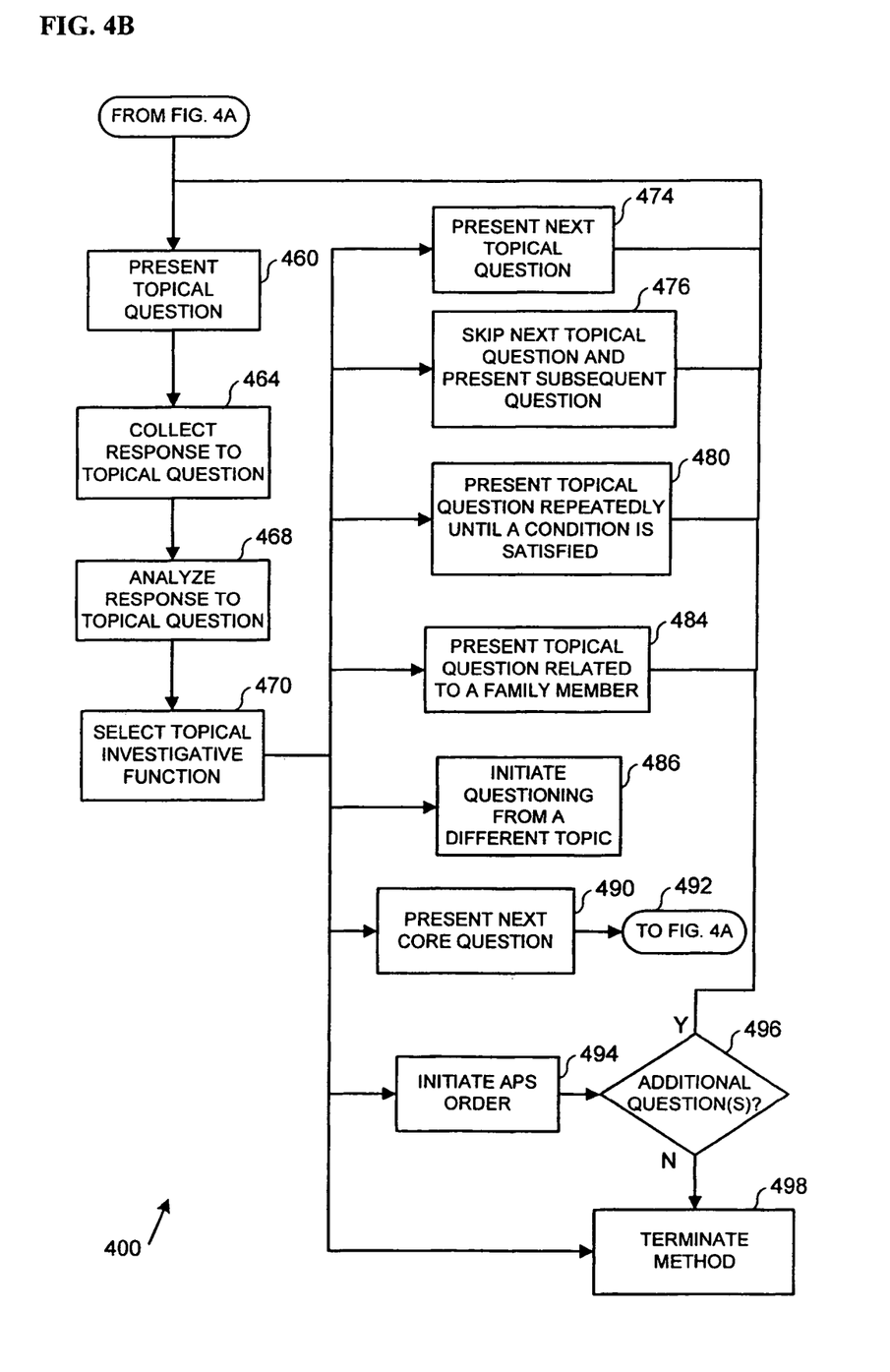

FIGS. 4A and 4B are a flow diagram illustrating several methods according to various embodiments of the invention. A method 400 may comprise a method for gathering information for insurance underwriting, including perhaps life insurance underwriting. The method 400 may commence at block 405 with presenting a core question from a core sequence of questions. Questions in the core sequence of questions may relate to an insurance underwriting function. The core sequence of questions may comprise categories and subsets of questions as previously described. The method 400 may continue at block 409 with collecting a response to the core question, and at block 413 with analyzing the response to the core question. The method 400 may also include selecting a core investigative function (CIF) to be performed based upon the analysis of the response to the core question, at block 417.

The CIF may comprise performing the method of blocks 405-417 using a next core question selected from the core sequence of questions, at block 420. Alternatively, the CIF may comprise performing the method of blocks 405-417 by skipping the next core question and instead presenting a subsequent core question selected from the core sequence of questions, at block 424. The CIF may alternatively comprise performing the method of blocks 405-417 including presenting the core question, the next core question, or the subsequent core question repeatedly until a condition is satisfied, at block 428. In another alternative, the CIF may comprise performing the method of blocks 405-417 including presenting one or more core questions associated with a child family member, at block 430.

The CIF may comprise initiating questioning from one or more topical sequences of questions, at block 432 and continuing to FIG. 4B via block 434. In a further alternative, the CIF may include initiating the ordering of an APS, at block 436. After initiating the ordering of the APS, the method of blocks 405-417 may be performed using the next core question if additional questions remain, at block 440. Otherwise, the method 400 may terminate, at block 444. The CIF may itself comprise terminating the method 400, at block 444.

Topical sequence(s) of questions may relate to an insurance underwriting function, and may include various topics, including the medical topics previously described. Initiating questioning from the topical sequence(s) of questions may include presenting a topical question, at block 460. A response to the topical question may be collected, at block 464. Topical questioning may include analyzing the response to the topical question, at block 468. Topical questioning may further include selecting a topical investigative function to be performed based upon the analysis of the response to the topical question, at block 470.

The topical investigative function to be performed may comprise several alternatives. The method of blocks 460-470 may be performed using a next topical question selected from the topical sequence(s) of questions, at block 474. Alternatively, the method of blocks 460-470 may be performed by skipping the next topical question from the at least one topical sequence of questions and presenting a subsequent topical question selected from the at least one topical sequence of questions, at block 476. In another alternative, the method of blocks 460-470 may be performed by presenting the topical question, the next topical question, or the subsequent topical question repeatedly until a condition is satisfied, at block 480. In a further alternative, the method of blocks 460-470 may be performed by presenting one or more topical question(s) associated with a child family member, at block 484.

Questioning may be initiated from a subsequent one of the topical sequence(s) of questions using the method of blocks 460-470, at block 486. The topical investigative function may alternatively comprise performing the method of blocks 460-470 using the next core question selected from the core sequence of questions, at block 490, and continuing to FIG. 4A via block 492. In another alternative, the ordering of an APS may be initiated, at block 494. The method of blocks 460-470 may then be performed using the next topical question selected from the topical sequence(s) of questions if additional questions remain, at block 496. Otherwise, the method 400 may terminate, at block 498. The topical investigative function may itself result in termination of the method 400, at block 498. Other methods may be possible.

Figure 5:
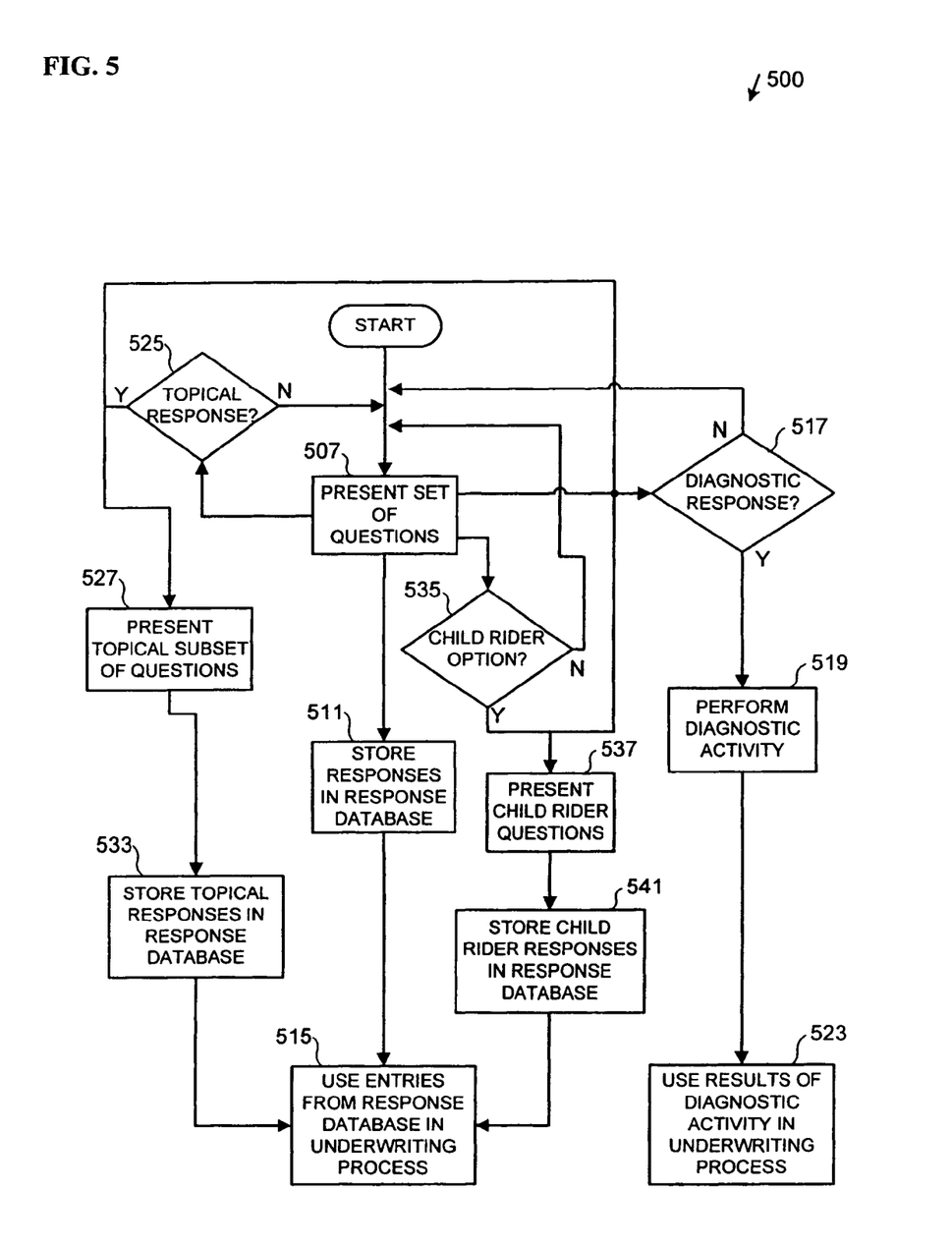

FIG. 5 is a flow diagram illustrating several methods according to various embodiments of the invention. A method 500 of using a reflexive underwriting application response module may begin at block 507 with presenting a set of questions to an applicant for insurance. The set of questions may comprise categories and subsets of questions as previously described. A selection of a subsequent question for presentation to the applicant may depend upon a response received from the applicant to one or more previous questions. The method 500 may continue at block 511 with storing a set of responses to the set of questions in a response database. The method 500 may also include using entries from the response database as a response input to an insurance underwriting process, at block 515.

The method 500 may further include performing a diagnostic activity upon sensing a diagnostic response to the set of questions, at blocks 517 and 519. The diagnostic activity may comprise ordering an attending physician statement, a urinalysis, a blood diagnostic test, a medical imaging diagnostic test, or a cardiac stress test, among others. A set of results from the diagnostic activity may be used as a diagnostic input to the insurance underwriting process, at block 523.

The method 500 may continue at blocks 525 and 527 with presenting a topical subset of questions to the applicant upon sensing a topically-related response to the set of questions. The topical subset of questions may comprise questions related to one or more medical conditions, among other topics. A set of topical responses to the topical subset of questions may be stored in the response database to use as a topical input to the insurance underwriting process, at block 533.

The method 500 may also include presenting a set of questions pertaining to a child family member associated with the applicant if a child rider option is selected, at blocks 535 and 537. The method 500 may conclude at block 541 with storing a set of child rider responses to the questions pertaining to the child family member in the response database. The set of child rider responses may be used as a child rider input to the insurance underwriting process.

Figure 6:
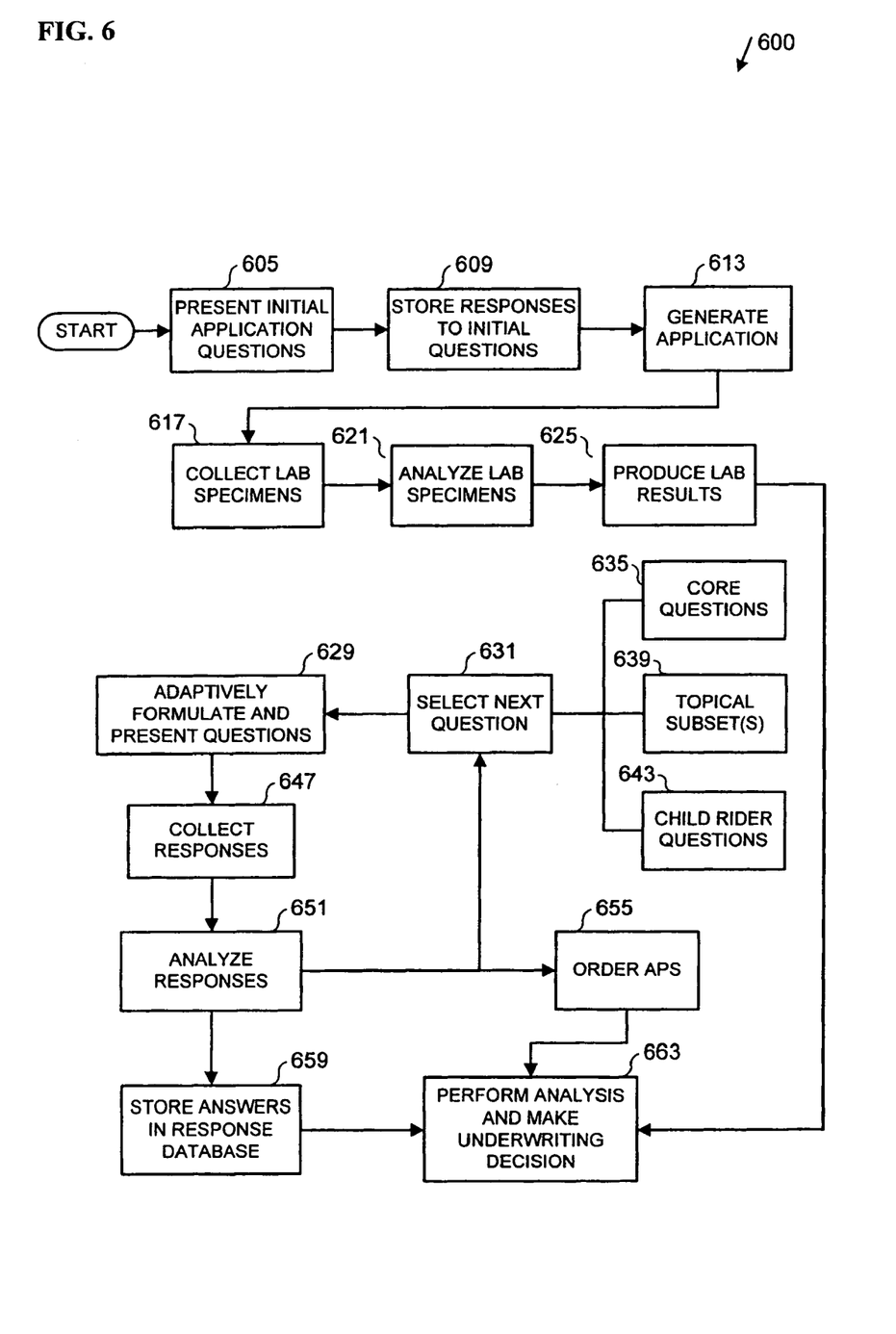

FIG. 6 is a flow diagram illustrating several methods according to various embodiments of the invention. A method 600 may begin at block 605 with presenting an initial set of questions to an applicant for insurance. The method 600 may continue at block 609 with storing responses to the initial set of questions in a response database. An application for insurance may be generated using an initial application module, at block 613. The method 600 may also include collecting medical laboratory specimens from the applicant using a specimen module in communication with the initial application module, at block 617. The specimens may be analyzed, at block 621; and lab results may be produced, at block 625.

The method 600 may continue with adaptively formulating and presenting a set of questions to the applicant using a reflexive underwriting application response module, at block 629. The set of questions may be associated with an insurance underwriting function, including perhaps life insurance underwriting. The set of questions may comprise a core set of questions and one or more topical subsets of questions.

The method 600 may also include selecting a next question using a sequencer component of the reflexive underwriting application response module, at block 631. The next question may be chosen based upon a response to a previous question. The next question may be chosen from the core set of questions, at block 635 or from the topical subset(s) of questions, at block 639. The next question may also be chosen from one or more subsets of questions pertaining to a child family member, if application is being made for a child rider, at block 643.

The method 600 may continue at block 647 with collecting a response to each question. The responses may be analyzed, at block 651. One or more questions associated with the set of questions may be selected as a result of the analysis, as previously described. One or more APSs may be ordered using an APS module in communication with the reflexive underwriting application response module, at block 655. The method 600 may also include storing the response to each question in a response database, at block 659.

The method 600 may conclude at block 663 with receiving and analyzing contents of the response database, the APS(s), and/or the set of laboratory results using an underwriting process module in communication with the response database, to the APS module, and to the specimen module. An insurance underwriting decision may result.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 7 below.

Figure 7:
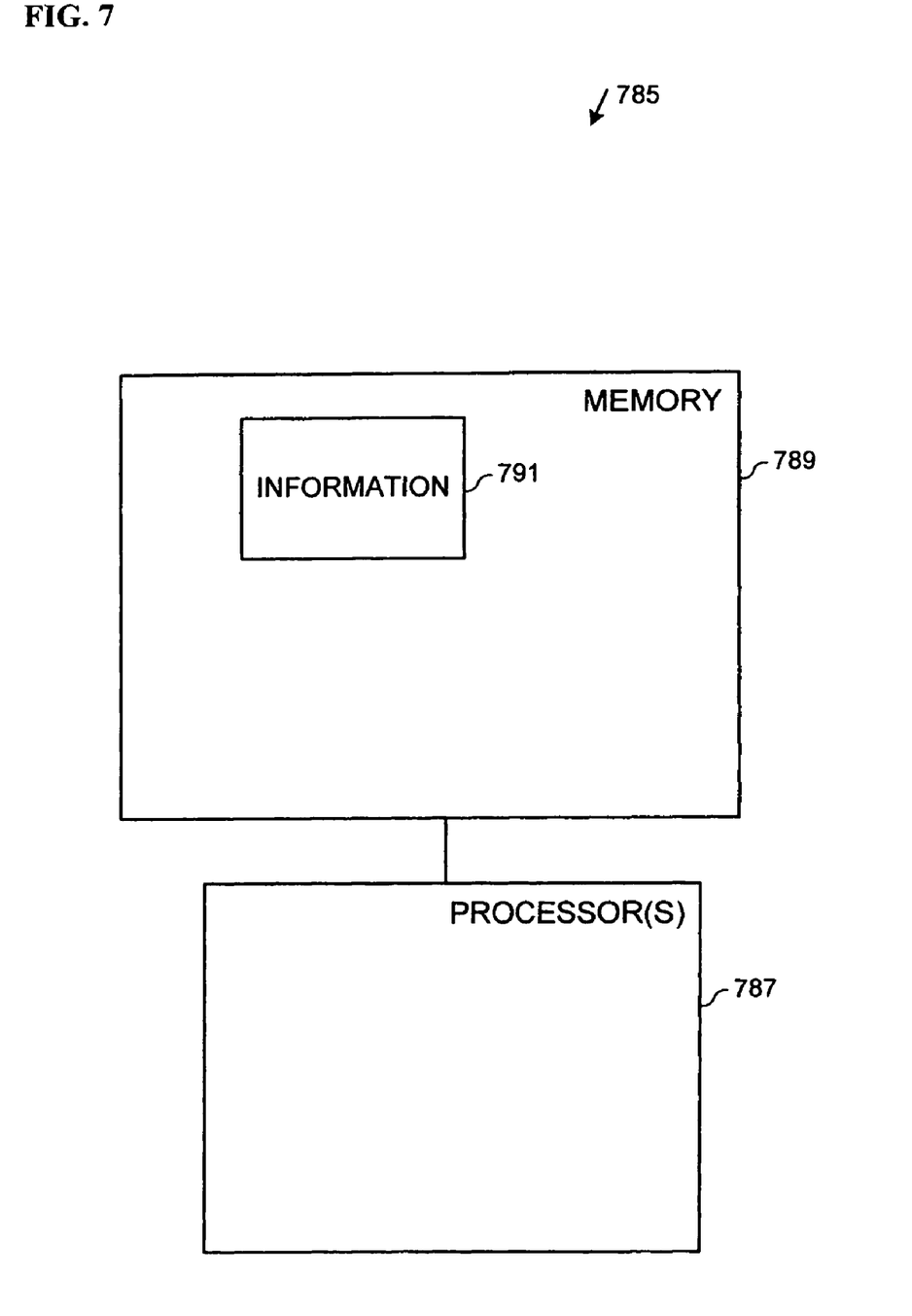
FIG. 7 is a block diagram of an article according to various embodiments of the invention.

FIG. 7 is a block diagram of an article 785 according to various embodiments of the invention. Such embodiments may comprise a computer, a memory system, a magnetic or optical disk, some other storage device, or any type of electronic device or system. The article 785 may include one or more processor(s) 787 in communication with a machine-accessible medium such as a memory 789 (e.g., a memory including electrical, optical, or electromagnetic elements). The medium may contain associated information 791 (e.g., computer program instructions, data, or both) which, when accessed, results in a machine (e.g., the processor(s) 787) performing the activities described previously herein.

Implementing the systems and methods disclosed herein may increase the accuracy and efficiency with which an insurance application interviewer identifies and documents information important to an insurance underwriting function. Disclosed embodiments may direct the interviewer to cause additional diagnostic activities to be performed when appropriate. Disclosed structures and methods may also assist the interviewer with correctly entering technical information, including perhaps information related to disease conditions and medications.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the claims are hereby incorporated into the Detailed Description, with each claim standing on its own as a separate embodiment.

What is claimed is:

1. A reflexive underwriting processor-implemented method, comprises:
   selecting a list of primary core questions from a pool of insurance questions;
   presenting the list of primary core questions for an insurance applicant;
   obtaining answers to the list of presented primary core questions;
   determining, via a processor, that at least one of the answers to the list of the presented primary core questions relates to a family member of the insurance applicant;
   selecting, via the processor, a list of secondary topical questions related to the family member from the pool of insurance questions based on the obtained answers to the list of presented primary core questions;
   presenting the selected list of secondary topical questions related to the family member;
   obtaining answers to some of the presented list of secondary topical questions related to the family member;
   selecting a list of tertiary subtopic questions related to the family member from the pool of insurance questions based on the obtained answers to some of the presented list of secondary topical questions related to the family member;
   presenting the selected list of tertiary subtopic questions related to the family member;
   obtaining answers to the presented list of tertiary subtopic questions related to the family member;
   presenting a next unanswered secondary topical question related to the family member upon obtaining answers to the presented list of tertiary subtopic questions related to the family member; and
   obtaining an answer to the presented next unanswered secondary topical question related to the family member.

2. The method of claim 1, wherein the selected list of tertiary subtopic questions pertains to a child rider option included in the insurance policy.

3. The method of claim 1, further comprises:
   providing an indication to perform one or more medical diagnostic activities including at least one of: ordering an attending physician statement; a urinalysis; a blood test; a medical imaging procedure; and a cardiac test; and
   obtaining results of the one or more medical diagnostic activities.

4. The method of claim 3, wherein the indication to perform the one or more medical diagnostic activities is provided based upon one of the obtained answers to the presented questions.

5. The method of claim 1, wherein the pool of insurance questions includes questions relating to: tobacco use; aviation; avocation; foreign travel; driving history; height; weigh; body systems; recent physical examinations; medical consultations; prescription medications; human immunodeficiency virus; acquired immune deficiency syndrome; medical diagnostic testing; prior applications for insurance; substance abuse; genetic propensities; and cancer.

6. A reflexive underwriting system, comprises:
   a processor; and
   a memory disposed in communication with the processor and storing processor-executable instructions, the instructions comprising instructions to:
      select a list of primary core questions from a pool of insurance questions;
      present the list of primary core questions for an insurance applicant;
      obtain answers to the list of presented primary core questions;
      determine that at least one of the answers to the list of the presented primary core questions relates to a family member of the insurance applicant;
      select a list of secondary topical questions related to the family member from the pool of insurance questions based on the obtained answers to the list of presented primary core questions;
      present the selected list of secondary topical questions related to the family member;
      obtain answers to some of the presented list of secondary topical questions related to the family member;
      select a list of tertiary subtopic questions related to the family member from the pool of insurance questions based on the obtained answers to some of the presented list of secondary topical questions related to the family member;
      present the selected list of tertiary subtopic questions related to the family member;
      obtain answers to the presented list of tertiary subtopic questions related to the family member;
      present a next unanswered secondary topical question upon obtaining answers to the presented list of tertiary subtopic questions related to the family member; and
      obtain an answer to the presented next unanswered secondary topical question related to the family member.

7. The system of claim 6, wherein the selected list of tertiary subtopic questions pertains to a child rider option included in the insurance policy.

8. The system of claim 6, the instructions further comprising instructions to:
provide an indication to perform one or more medical diagnostic activities including at least one of: ordering an attending physician statement; a urinalysis; a blood test; a medical imaging procedure; and a cardiac test; and
obtain results of the one or more medical diagnostic activities.

9. The system of claim 8, wherein the indication to perform the one or more medical diagnostic activities is provided based upon one of the obtained answers to the presented questions.

10. The system of claim 6, wherein the pool of insurance questions includes questions relating to: tobacco use; aviation; avocation; foreign travel; driving history; height; weigh; body systems; recent physical examinations; medical consultations; prescription medications; human immunodeficiency virus; acquired immune deficiency syndrome; medical diagnostic testing; prior applications for insurance; substance abuse; genetic propensities; and cancer.

11. A processor-readable medium tangibly storing processor-executable instructions, the instructions comprising instructions to:
select a list of primary core questions from a pool of insurance questions;
present the list of primary core questions for an insurance applicant;
obtain answers to the list of presented primary core questions;
determine that at least one of the answers to the list of the presented primary core questions relates to a family member of the insurance applicant;
select a list of secondary topical questions related to the family member from the pool of insurance questions based on the obtained answers to the list of presented primary core questions;
present the selected list of secondary topical questions related to the family member;
obtain answers to some of the presented list of secondary topical questions related to the family member;
select a list of tertiary subtopic questions related to the family member from the pool of insurance questions based on the obtained answers to some of the presented list of secondary topical questions related to the family member;
present the selected list of tertiary subtopic questions related to the family member;
obtain answers to the presented list of tertiary subtopic questions related to the family member;
present a next unanswered secondary topical question upon obtaining answers to the presented list of tertiary subtopic questions related to the family member; and
obtain an answer to the presented next unanswered secondary topical question related to the family member.

12. The medium of claim 11, wherein the selected list of tertiary subtopic questions pertains to a child rider option included in the insurance policy.

13. The medium of claim 11, the instructions further comprising instructions to:
provide an indication to perform one or more medical diagnostic activities including at least one of: ordering an attending physician statement; a urinalysis; a blood test; a medical imaging procedure; and a cardiac test; and
obtain results of the one or more medical diagnostic activities.

14. The medium of claim 13, wherein the indication to perform the one or more medical diagnostic activities is provided based upon one of the obtained answers to the presented questions.

15. The medium of claim 11, wherein the pool of insurance questions includes questions relating to: tobacco use; aviation; avocation; foreign travel; driving history; height; weigh; body systems; recent physical examinations; medical consultations; prescription medications; human immunodeficiency virus; acquired immune deficiency syndrome; medical diagnostic testing; prior applications for insurance; substance abuse; genetic propensities; and cancer.

* * * * *